(No Model.)

C. HALL.
RIVETING MACHINE.

No. 373,891. Patented Nov. 29, 1887.

Witnesses:
J. Staib
Chr. H. Smith

Inventor.
Charles Hall
per Lemuel W. Serrell atty.

UNITED STATES PATENT OFFICE.

CHARLES HALL, OF NEW YORK, N. Y.

RIVETING-MACHINE.

SPECIFICATION forming part of Letters Patent No. 373,891, dated November 29, 1887.

Application filed June 17, 1887. Serial No. 241,592. (No model.)

*To all whom it may concern:*

Be it known that I, CHARLES HALL, of the city and State of New York, have invented an Improvement in Riveting-Machines, of which the following is a specification.

Machines have been made in which the hinge-pins of butt-hinges have been upset at the two ends simultaneously, and sufficiently to prevent end motion to such hinge-pins; but this machine is not adapted to act upon iron rivets in a hot condition, as the same are made use of in riveting together iron and steel plates in making boilers and other structures.

In riveting-machines heretofore constructed rivets are made use of that have heads; but in practice it is found that the rivet-heads are liable to break off, especially when they have been overheated, because the previously-formed head is not worked or hammered up to consolidate the same during the time that a head is being riveted up on the other end.

The object of the present invention is to upset or force the two heads simultaneously upon the two ends of a rivet, so that both heads will be of uniform strength, and the metal of the rivet will be upset with uniformity, so as to fill the holes in the sheets, whether those holes coincide exactly or not, thereby rendering both ends of the rivet uniform in strength. To accomplish these objects I provide for holding the plates or articles to be riveted in their proper positions, equalizing the lengths of the projecting ends of the plain heated rivet, and for pressing on the ends of the rivet with heading-dies that form both heads on the ends of the rivet simultaneously, and in so doing the rivet is upset or swelled, so as to entirely fill the holes in the sheets or plates that are riveted together.

Figure 1:
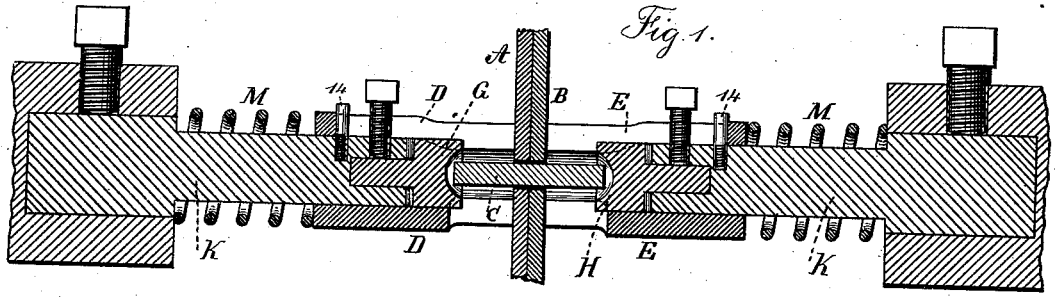
Figure 2:
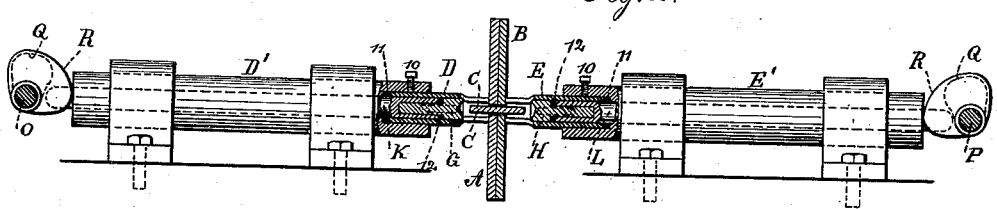
Figure 3:
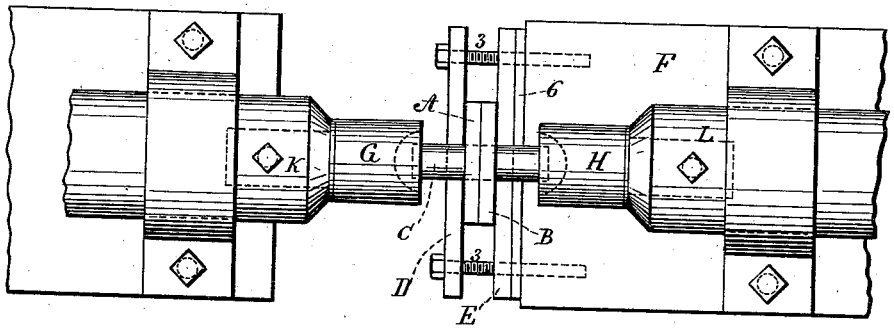
Figure 4:
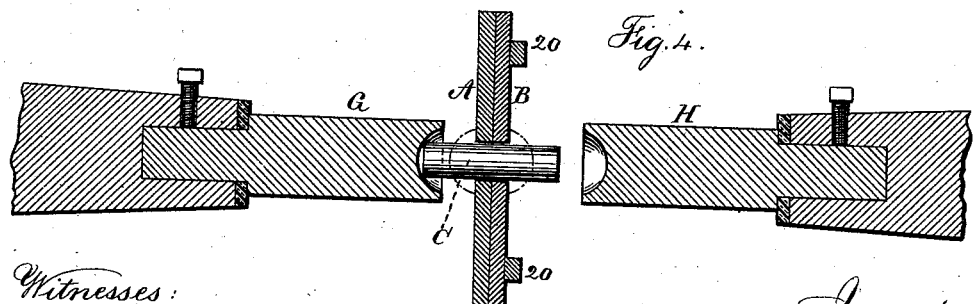

In the drawings, Figure 1 is a section of the mechanism made use of by me in riveting up plates by one continuous movement. Fig. 2 is a similar view of the apparatus where one motion is given to clamp the plates and a second to rivet up the heads. Fig. 3 is a view of the apparatus with independent clamps, and Fig. 4 is a diagram illustrating a mode of operation that may be employed.

Referring to Fig. 3, A B represent the two plates or pieces of material that are to be riveted together, and C the cylindrical heated rivet passing through the holes in A B. These plates A B may be placed in any suitable holder to keep them in position.

I have shown the holders D E as connected by screws 3 to a fixed support, F.

The headers G H are in stocks K L, to which an endwise movement is given by cams, as hereinafter described, or by other suitable means, and each header is made with a concave end corresponding in shape to the required rivet-head. These headers act against the ends of the rivet and move the same endwise, should it not be accurately in position, and the continuation of the movement upsets the rivet and forms the two heads simultaneously. In this case it is sometimes necessary to place one or more filling-plates at 6 between the holder E and the fixed abutment F, so that different thicknesses of plates or sheets may be properly held while riveted together, so that the heads will be of uniform size and strength.

In Fig. 2 the headers G H are at the ends of the stocks K L, and there are represented shafts O P, with cams Q, for giving motion simultaneously to the stocks and headers, the parts being supported in any suitable framework. In this case the holders D E are tubular and surround the stocks of the headers and slide endwise, and the cams R act upon the outer ends of the stocks of the holders to move these up toward the sheets or articles A B and hold them in proper relation to the headers, after which the headers are brought up by the cams Q, and the rivet C is moved endwise, if necessary, to render the projecting ends equal, and then the rivet-heads are pressed up upon the ends of the rivet simultaneously.

It is advantageous to have the holders D E separate from their stocks D' E', so that the holder portions may be adjusted by releasing the set-screws 10 and changing the washers or packings at 11, so as to suit the various thicknesses of metal, and the holders should be open or slotted both top and bottom to facilitate the insertion of the rivet and to allow scale to drop away. The headers are also held by set-screws, and by changing the washers 12 they may be adjusted to suit the thickness of the articles being riveted and the amount of iron that is pressed up into the rivet-heads.

In Fig. 1 the holders D E are similar to those in Fig. 2, except that they are projected by springs M around the stocks of the headers, and the movement is limited by pins 14. In this case the two heading-dies may be brought up simultaneously at opposite sides, as before, or the header G may be stationary and the motion be given to the header H only. In this instance the sheets A B should be suspended so as to swing slightly as the header is brought up, and the holders and springs yield equally as the rivet-heads are formed.

In Fig. 4 the heading-die G is to be stationary and supported in any suitable manner, and the die H is to be moved by suitable means, and the sheets rest against the adjustable stops at 20 while the rivet C is being inserted, and the header G becomes a gage, so that the rivet will project equally at each side of the sheet. The two rivet-heads will be formed simultaneously and equally by the movement of the header H, or both headers H and G may be moved simultaneously.

I prefer to make use of the holding devices shown in Figs. 1, 2, and 3, because they press the two articles together that are being riveted up, and at the same time hold such articles and prevent any lateral movement, so that the rivet is kept in line with the axis of the heading-dies.

The washers 12 between the heading-dies and die-stocks allow for adjusting the dies in relation to the gages, so that the rivet-blank will be brought into exactly the position required for heading.

I claim as my invention—

1. The method herein specified of riveting together boiler-plates and other articles, consisting in inserting into the coinciding holes a heated solid rivet-blank without a head and bringing the blank into the proper position relatively to the plates and forming both heads simultaneously at the ends of the rivet-blank by the pressure of heading-dies, substantially as set forth.

2. The combination, in a riveting-machine, of holders or gages for keeping the boiler-sheets or other articles in position, heading-dies, and mechanism for actuating such dies simultaneously, substantially as set forth.

3. The combination, in a riveting-machine, of heading-dies, a holder surrounding each heading-die, and mechanism for giving motion to the parts for holding the articles to be riveted and for heading both ends of a heated rivet simultaneously, substantially as set forth.

4. The combination, with the oppositely-moving heading-dies, of stocks receiving the shanks of the heading-dies and washers, the holders around such heading-dies, the stocks and washers for the same, and mechanism for giving motion to the parts for holding the articles to be riveted and for riveting up both ends of a rivet-blank simultaneously, substantially as set forth.

5. The combination, with the two heading-dies for simultaneously riveting up heads on the two ends of a heated rivet-blank, of the means, substantially as specified, of guiding or holding together the sheets or articles to be riveted, so that the heading-dies will render the projecting portions of the rivet uniform at the sides of the article and then simultaneously head both ends of the rivet, substantially as set forth.

6. The combination, with the stationary and moving heading-dies, of a gage against which the articles to be riveted together rest, so as to determine the extent that the respective ends of the rivet project, and then allow the articles to be moved toward the stationary heading-die as the two heads are simultaneously formed on the rivet, substantially as specified.

Signed by me this 13th day of June, 1887.

CHAS. HALL.

Witnesses:
  GEO. T. PINCKNEY,
  WILLIAM G. MOTT.